United States Patent
Rodkey et al.

(10) Patent No.: US 7,130,389 B1
(45) Date of Patent: *Oct. 31, 2006

(54) DIGITAL NOTIFICATION AND RESPONSE SYSTEM

(75) Inventors: Ryan Scott Rodkey, Sugarland, TX (US); David Lynn Hickey, Rosharon, TX (US); Darren Lynn Ross, Houston, TX (US)

(73) Assignee: Tech Radium, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/117,594

(22) Filed: Apr. 28, 2005

(51) Int. Cl.
*H04M 1/64* (2006.01)
(52) U.S. Cl. .................. 379/88.12; 455/412.2
(58) Field of Classification Search ............ 379/88.12, 379/79, 88.19, 201.01
See application file for complete search history.

(56) References Cited

U.S. PATENT DOCUMENTS

| | | | |
|---|---|---|---|
| 6,463,462 B1 | 10/2002 | Smith | 709/206 |
| 6,496,568 B1 * | 12/2002 | Nelson | 379/88.12 |
| 6,697,477 B1 * | 2/2004 | Fleischer et al. | 379/211.02 |
| 6,871,214 B1 | 3/2005 | Parsons | 709/206 |
| 6,912,691 B1 * | 6/2005 | Dodrill et al. | 715/513 |
| 6,931,415 B1 * | 8/2005 | Nagahara | 707/102 |
| 2002/0032020 A1 * | 3/2002 | Brown et al. | 455/414 |

* cited by examiner

*Primary Examiner*—Gerald Gautheir
(74) *Attorney, Agent, or Firm*—Buskop Law Group, P.C.; Wendy K. Buskop

(57) ABSTRACT

A digital notification and response system utilizes an administrator interface to transmit a message from an administrator to a user contact device. The system comprises a dynamic information database that includes user contact data, priority information, and response data. The administrator initiates distribution of the message based upon grouping information, priority information, and the priority order. The message is transmitted through at least two industry standard gateways simultaneously to groups of user contact devices based upon priority information. Once the message is received by the user contact device, the user contact device transmits a response through the industry standard gateways back to the dynamic information database.

19 Claims, 2 Drawing Sheets

DIGITAL NOTIFICATION AND RESPONSE SYSTEM

FIELD

The present embodiments relate generally to the creation and delivery of messages, to the routing, and to the verification and collection of responses to the messages. The system and methods are universally applicable to, and independent of, the type of messaging system and device selected by the message recipients.

More particularly, the present embodiments relate to an immediate response information or emergency system.

BACKGROUND

Businesses and their employees are actively involved in sending and receiving information using a variety of messaging formats, systems, and message receiving devices. For example, a traveling employee might, in a single trip away from the office, receive messages sent by fax, pager, electronic mail (e-mail), and voice mail. In addition, the messaging devices by which these messages are actually received might include a pager, a cellular telephone, a paper fax machine, a voice mailbox, or a portable computer connected to the Internet or to a private local area network (LAN). Often these messages will vary in their level of importance. This could affect the delivery methods and/or the nature and timing of any needed response to the message. For example, the arrival of an e-mail message from a particular sender might cause the recipient to fax a report in response. A message reporting a failure in a mission-critical computer system may need an immediate response from a maintenance technician that the message has been received and will be acted on. A message reporting a fire or other disaster may need to be sent simultaneously, or in a notification hierarchy, to multiple members of a disaster response team, with escalating methods of messaging and response gathering to insure that every team member has been notified and has responded in an appropriate fashion. In some group messaging contexts, the post-message processing, organizing, and reporting of multiple message responses can be important in further decision making by the message originator.

The prior art methods implemented in commercially available unified messaging and device specific systems generally provide one-way delivery, with destinations defined by the sender. Unfortunately, prior art systems do not solve the need for originating a message, with attachment and response requirements, in a manner and format that is independent of the type of the device that is to be used for delivering the message to the recipients. Also, prior art systems do not permit the message notification methods to be defined by the recipients, and do not include a facility for automatic processing and organization of message responses. Accordingly, known e-mail, unified messaging and specific device systems using these prior art methods are deficient in responding to these requirements.

A need exists for a system and method for automating and escalating the delivery of messages and collection of message responses implemented through messaging devices of multiple types. The system needs to work in conjunction with recipient rules routing, verification of notification and response, and collection of responses in a predefined format.

A need exists for a digital information and response system to bridge the gap between the government and the public for communication without being limited to one device.

A need exists for a method of communication from an administrator which reaches all possible forms of communication devices, so that all members of the public can be reached.

A need exists for a system that can transmit a message in multiple languages to multiple user devices to inform the public of emergency situations, and general information simultaneously.

The present embodiments meet these needs.

BRIEF DESCRIPTION OF THE DRAWINGS

The detailed description will be better understood in conjunction with the accompanying drawings as follows.

Figure 1:
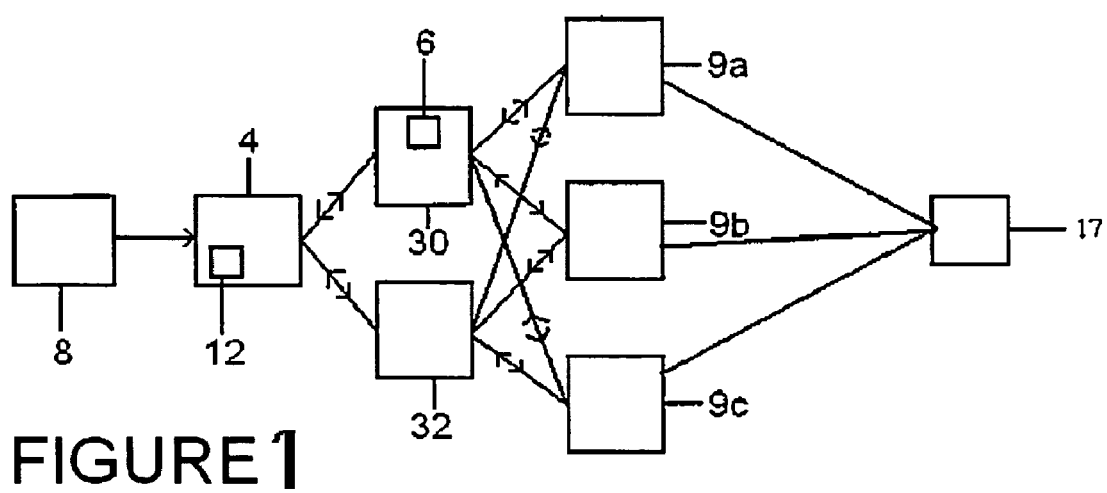
FIG. 1 depicts a representation of an embodiment of a digital notification and response system.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the invention can be practiced or carried out in various ways.

The present embodiments relate to an immediate response information or emergency system. The present embodiments relate to the creation and delivery of messages, and to the routing, and to the verification and collection of responses to the messages. The system and methods are universally applicable to, and independent of, the type of messaging system and device selected by the message recipients. The present embodiment relates to the simultaneous transmission of a message in multiple languages to a user device, wherein the recipient of the message selects the language for transmission to the recipient.

The embodied immediate response information systems provide a timely and uniform manner to contact numerous users through numerous user contact devices, such as a cell phone, a television, a LED display, a land phone line, an e-mail address, a fax machine, a pager, a digital display, similar devices, and handheld wireless device, including PDAs and blackberries.

The system is used to contact users in the case of emergency conditions, such as storms or fire; and in the case of informational situations, such as school closings. Additionally, terrorist threat levels can be transmitted using this system. The system can be used to advise office building superintendents and users in the buildings, such as user high rise office buildings, concerning building condition updates, parking garage conditions, car lights on situations, and disabled vehicle conditions. The systems can be used for the sports industry, such as children's soccer or Major League Baseball games, wherein the systems can be used to update fans on changed game times, weather conditions that affect a game start. The systems can also be used to update status of wins and losses on a "real time" basis to fans and parents user contact devices.

The present embodiments provide a system that has a high speed notification and response system in which information is accessed and stored in a dynamic information database. The systems can be set to contact users automatically when specific conditions arise or to contact user when initiated by an administrator. The systems can be set to contact a large number of users in a systematic manner based upon priority.

The present embodiments can be used save lives because the system can notify large groups of individuals concerning very dangerous situations quickly to many different devices. The system can be used to stop rumors that a situation is safe. This system stops panic and chaos, because the system can send a consistent message to all users on the system.

The embodied immediate response information systems provide other benefits, such as general information update, which are not emergency situations. For example, a message can be sent such as "bring a flower to your teacher tomorrow because it is her birthday" to all parents of students of a second grade teacher using the system.

With reference to the figures, FIG. 1 examples an embodiment of a digital notification and response system, wherein an administrator (8) can transmit one or more messages (6) to one or more user contact devices (9a, 9b, and 9c) using an administrator interface (4).

The administrator (8) can be a person, a computer, an analog emergency notification system, or another digital notification and response system or the like. The administrator (8) interacts with the administrator interface (4) to begin the process of sending a message to the user contact devices (9a, 9b, and 9c). The administrator interface (4) can be a local area network interface, a wide area network interface, a virtual private network interface, asynchronous transfer mode interface, synchronous optical network interface, a call center, a voice mail, or other similar means to transmit a message to numerous contacts.

The message can be a text message, a numerical message, one or more images or a combination of these. The message can be encoded. The message can include a designation that identifies the importance the message. Examples of these designations include low priority, general priority, significant priority, high priority, and severe priority. The designations can coincide with the Homeland Security's five-color system. For example, the designations can be color-coded, such as green for a low priority message, blue for a preparedness message or general priority message, yellow for a cautionary message such as a significant priority, orange for an emergency message or high priority message, or red for a critical message with a severe priority. These priority levels can be customized to corporate levels of emergencies, or they can be tailored to standards for a particular industry, like Building owners and managers standards codes for risks or emergencies in a building.

As seen in FIG. 1, the message (6) is transmitted to one or more user contact devices (9a, 9b, and 9c). Examples of usable user contact devices include handheld wireless devices, wireless phones, land phones, e-mail addresses, digital displays, and LED display, fax machines, pagers, and similar devices that capable of receiving a message. An example of a handheld device includes a PDA, a blackberry, or cellular phone.

The message (6) is stored on a dynamic information database (12). The message can be a prewritten message stored in the database for subsequent use by the administrator or can be generated from the dynamic information database (12) based upon inputs from the administrator and transmitted using the administrator interface.

Figure 2:
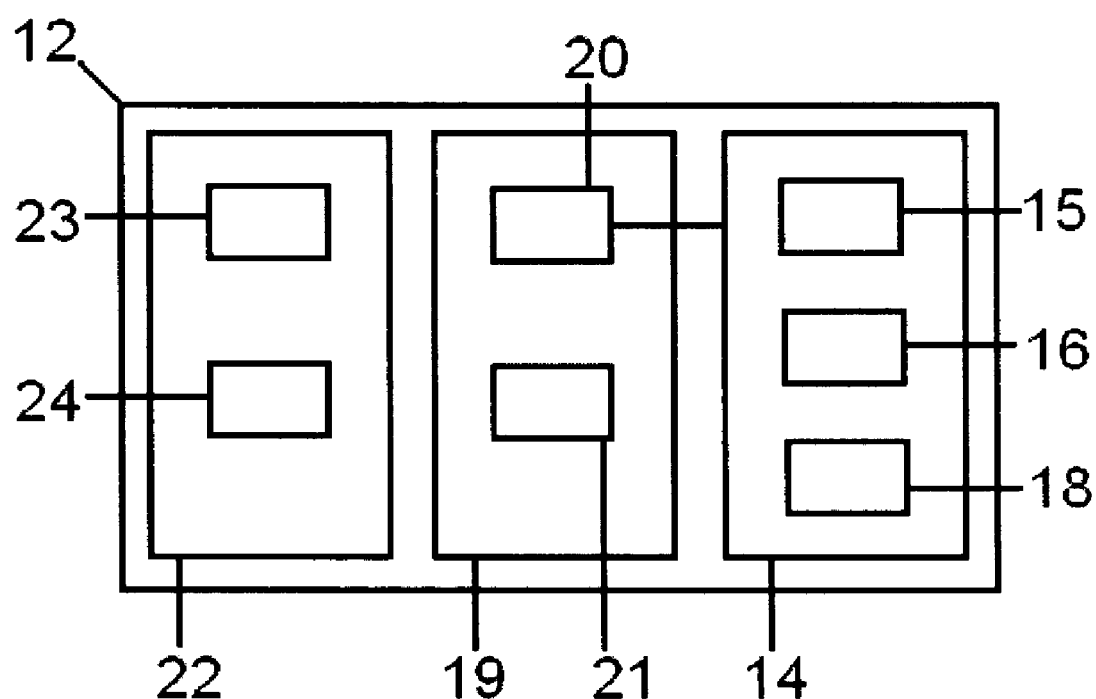
FIG. 2 depicts a representation of an embodiment of a dynamic information database associated with a digital notification and response system.

FIG. 2 shows a schematic of the dynamic information database (12). The dynamic information database (12) includes three sections: user contact data (14), grouping information (19), and response data (22). The dynamic information database (12) can be an SQL™ database, MySQL™ database or other industry standard databases, an Oracle(™) database, or other similar database that can organize information in a similar manner.

The user contact data (14) in the dynamic information database (12) includes user contact information (15), priority information (16), and user selected language for the message (18). The user contact data (14) includes information associated with the user of the user contact device. The user, within the scope of this application, is a person that can receive a message, send a message, respond to a message, or combinations thereof. Examples of users include a company, employees of company, an individual, a parent of a child, a fire department, a coach of a youth sports team, a team manager of a youth sports team, the manager of a major league sports team, sports team representative, mom or dad of a sports team player, a police department, a commercial property manager, a school system, an adult, a security company, or combinations thereof.

The user contact information (15) includes information concerning both the user contact device and the user. The user contact information (15) can include an e-mail address, an internet protocol (IP) address, a phone number, and combinations thereof. The user contact information (15) can further include the user's name, the user's address, the user's phone number, the user's device address, the user's social security number, an account code, and combinations thereof. Each user contact device can include information that is unique to each individual user contact device or can include information that is common to all user contact devices. For example, a serial number for a cell phone, a mac address for an Ethernet card and so on.

The user contact data (14) further includes priority information (16). The priority information (16) is used to indicate a contact order for various user devices of the user. The contact order is used to direct the order in which the dynamic information database (DID) transmits a message to the user contact devices (9a, 9b, and 9c).

The user contact data (14) can include information beyond the examples listed in order to aid the DID in contacting the user contact devices.

Continuing with FIG. 2, the grouping information (19) in the dynamic information database (12) is used to group users together into separable and identifiable groups for ease of contact by an administrator. The grouping information (19) can include one or more groups (20) associated with the user contact data (14). By grouping the users, the system provides the benefit of more efficient delivery of information without having to treat each user individually. Grouping more efficiently defines message recipients, which speeds the delivery of the message.

The grouping information can includes a predefined group identified in the dynamic information database. The predefined group can be identified by the administrator or by another user in advance to sending the message. Examples of groupings include parents of a second grade class, an alumni class from a specific year, members of the Bad News Tigers little league soccer team, all Tuesday night home game subscribers to a certain major league baseball team, executives of a given company, hazmat response teams, and other similar groupings.

The grouping information (19) further includes a priority order for contacting a user within the group (20). The priority order directs the administrator interface (4) as to the order in which the interface should contact the individual contact devices with the message. The priority order provides the benefit of ensuring that the most critical users receive the message first in case time is not available to contact all of the users. The priority order also provides the benefit that all users get contacted with equal priority, rather than a discriminating message delivery priority. The priority order guarantees that all users get contacted to on a preferred device first.

The response data (22) in the dynamic information database (12) is directed towards information based upon whether the user contact device and, in turn, the user, received the message. The response data (22) includes user response information (23) that indicates whether the user (17) has received the message (6). The user response information (23) is gathered by the dynamic information database (12). The response data (22) further includes "error-in-response" information (24) that indicates the user contact data (14) is insufficient and can not be delivered properly. The error in response information (24) can also indicate that an email address or phone number is simply invalid.

Returning to FIG. 1, the administrator (8) can initiate a distribution of one or more messages (6). The system can be initiated automatically. Fire alarms when set off, can automatically alert the system, and then the system can automatically advise a user. Another example is that the system can tie to a tracking system, so that if a child misses certain periods of school, the system can advise the parent that the student is missing those classes.

The system uses the information in the dynamic information database (12) namely the grouping information (19), priority information (16), and the priority order (21), to determine who to contact and in what order.

The message (6) is transmitted through at least two industry standard gateways (30 and 32) simultaneously. By transmitting the message (6) through numerous gateways, the system provides redundancy in order to ensure the message is relayed to the users. An example of an industry standard gateway is a SMTP gateway, a SIP, an H.323, an ISDN gateway, a PSTN gateway, a softswitch, or the like.

The priority order directs the administrator interface (4) to contact a first group of user contact devices (9a) indicated as a first contact. After all of the user contact devices in the first contact have received the message, the priority order directs the administrator interface (4) to contact a second group of user contact devices (9b) indicated as a second contact. Then the administrator interface continues to contact user contact devices based on the priority order until all user contact devices are reached and a response is provided from the user contact devices.

Once the message is received by a user contact device, the user contact device (9a, 9b, and 9c) transmits a response back through the industry standard gateways (30 and 32) to the dynamic information database (12). The dynamic information database (12) stores the responses and the unique address of each user contact device.

In an alternative embodiment, the system can include reporting information in order to generate reports based upon information in the dynamic information database (12). The reports can be generated by the administrator, the user, a group, or combinations thereof. The reports can include a date the message was sent, a time the message was sent, a date the message was received, a time the message was received, content of the message, a recipient of the message, recipient information related to the recipient of the message, and combinations thereof. Other examples include the name of the person who received the message, a copy of the voice mail, a time when an e-mail was accessed, the time when a fax is printed and so on. The administrator can create custom designed reports, or standard reports can be generated from the dynamic information database for use by the administrator.

In an alternative embodiment, the system can include a language converter to translate a text message to second language. The language converter is often referred to as a text translator. For example, the language converter can convert the message from English to a second language, such as Korean, Chinese, Vietnamese, French, English, Spanish, Italian, Norwegian, Swedish, German, Japanese, Russian, or Portuguese. The language converter is beneficial because not all users speak the same language and this breaks down the communication between groups of people due to language. The system allows the user to designate a specific language in which to receive the message. The chosen language is stored in the dynamic information database (12) with the user contact data (14).

In an alternative embodiment, the system can include a text-to-sound file converter. The text-to-sound file converter can be used to translate a message from text to a sound file. The text-to-sound file converter is beneficial because the message is consistent using the same voice, with the same accent, same dynamic, same delivery speed. The text-to-sound file converter enables individuals with disabilities, namely visual impairment, to also receive the consistent message.

The embodiments have been described in detail with particular reference to certain preferred embodiments, thereof, but it will be understood that variations and modifications can be effected within the scope of the embodiments, especially to those skilled in the art.

What is claimed is:

1. A digital notification and response system, comprising:
  a. an administrator interface for preparing and transmitting a message from an administrator to at least one user contact device;
  b. a dynamic information database for storing the message, wherein the dynamic information database comprises;
    i. user contact data comprising:
      1. user contact device information; and
      2. user selected priority information that indicates a contact order for the user contact device;
    ii. user selected grouping information comprising:
      1. at least one group associated with each user contact device; and
      2. a priority order for contacting each user contact device within the group;
    iii. response data comprising:
      1. user response information that indicates individual user contact devices have received the message; and
      2. response information that indicates when insufficient user contact device information exists to contact the user contact devices;
  wherein the administrator initiates distribution of the message using the grouping information, priority information, and the priority order, and wherein the message is transmitted through at least two industry standard gateways simultaneously, wherein the two industry standard gateways are selected from the group consisting of: a SMTP gateway a SIP, an H.323, an ISDN gateway, a PSTN gateway, a softswitch, and combinations thereof, wherein the message is received by the at least one user contact device, and the at least one user contact device transmits a response through the industry standard gateways to the dynamic information database.

2. The system of claim 1, wherein the user contact data further comprises a user selected language for translating the message to be transmitted.

3. The system of claim 2, further comprising a language converter for translating the message to be transmitted into the user selected language.

4. The system of claim 1, further comprising a text-to-sound file converter for translating the message from text to a sound file.

5. The system of claim 1, further comprising reporting information for generating custom designed reports created by the administrator, the user, the at least one group, or combinations thereof, standard reports generated from the dynamic information database, or combinations thereof.

6. The system of claim 5, wherein the reporting information comprises a date the message was sent, a time the message was sent, a date the message was received, a time the message was received, content of the message, a recipient of the message, recipient information for the message, and combinations thereof.

7. The system of claim 1, wherein the administrator interface is a local area network web interface, a wide area network web interface, virtual private network interface, asynchronous transfer mode interface, synchronous optical network interface a call center interface, a voice mail, or combinations thereof.

8. The system of claim 1, wherein the administrator is a person, a computer, another digital notification and response system, an analog emergency notification system, and combinations thereof.

9. The system of claim 1, wherein the message comprises a designation selected from the group consisting of low priority, general priority, significant priority, high priority, and severe priority.

10. The system of claim 9, wherein the designation comprises a color associated with each different priority.

11. The system of claim 1, wherein the message is a prewritten message stored in the dynamic information database for subsequent use by the administrator.

12. The system of claim 1, wherein the dynamic information database is an SQL™ database, MySQL™ database, other industry standard databases, an Oracle™ database, or combinations thereof.

13. The system of claim 1, wherein the grouping information is a predefined group identified in the dynamic information database, wherein the predefined group is identified by the administrator prior to transmitting the message.

14. The system of claim 1, wherein the user contact data is a member selected from the group consisting of an user name, an user address, an user phone number, an user device address, a social security number, an account code, and combinations thereof.

15. The system of claim 1, wherein the at least one group is: a police department, a commercial property manager, a company, a parent of a child, a fire department, a school system, an adult, a security company, or combinations thereof.

16. The system of claim 1, wherein the priority order is selected by a user.

17. The system of claim 16, wherein the priority order directs transmission of the message first to all user contact devices indicated as a first contact by the user, then second to all user contact devices indicated as a second contact by the user, then continues contacting user contact devices based on the priority order until all user contact devices are contacted.

18. The system of claim 1, wherein the user contact device is a handheld wireless device, a wireless phone, a land phone, an email address, a fax machine, a pager, a digital display, an LED display, or combinations thereof.

19. The system of claim 1, wherein the user contact device comprises an unique address.

* * * * *